H. R. SESSIONS.
WEIGHT REGISTERING ATTACHMENT FOR SCALES.
APPLICATION FILED AUG. 22, 1917.
1,282,646.
Patented Oct. 22, 1918.
3 SHEETS—SHEET 1.
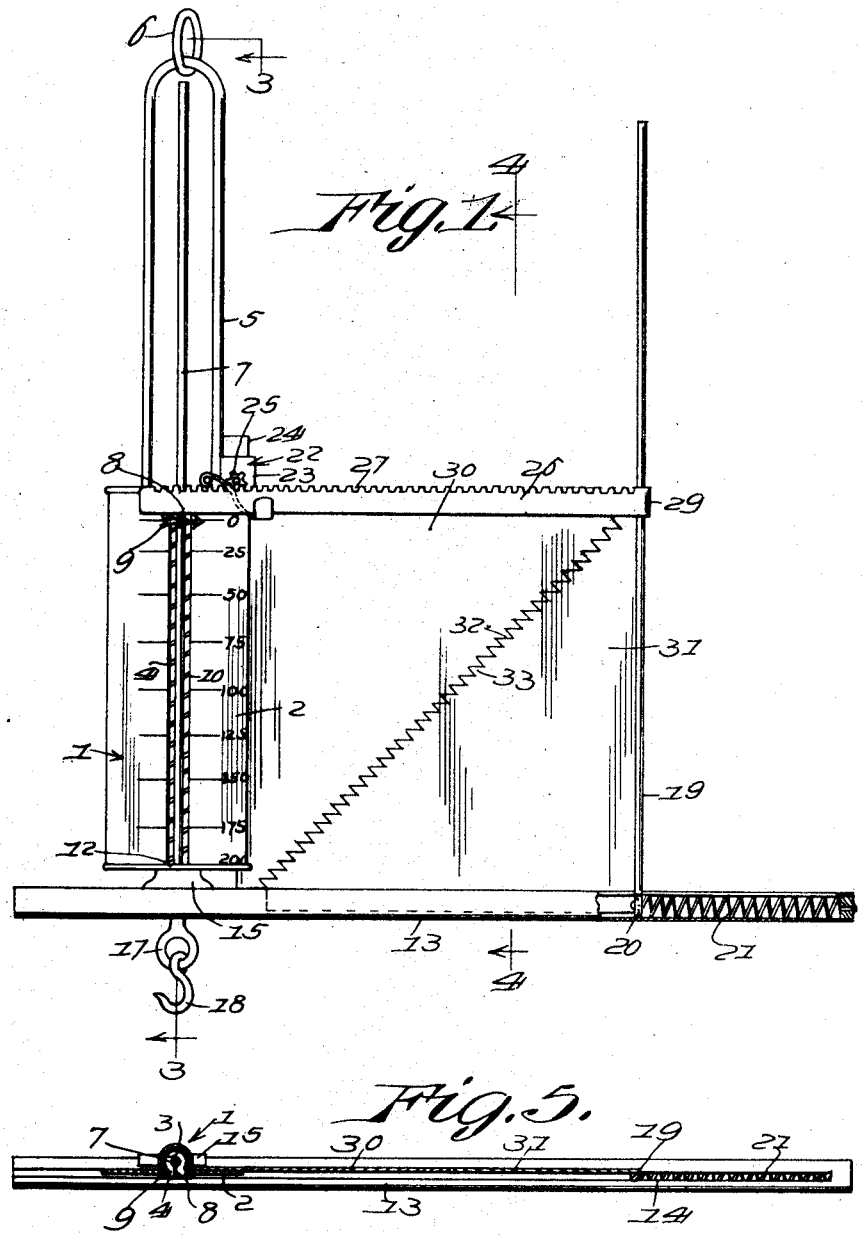

H. R. SESSIONS.
WEIGHT REGISTERING ATTACHMENT FOR SCALES.
APPLICATION FILED AUG. 22, 1917.
1,282,646.
Patented Oct. 22, 1918.
3 SHEETS—SHEET 2.
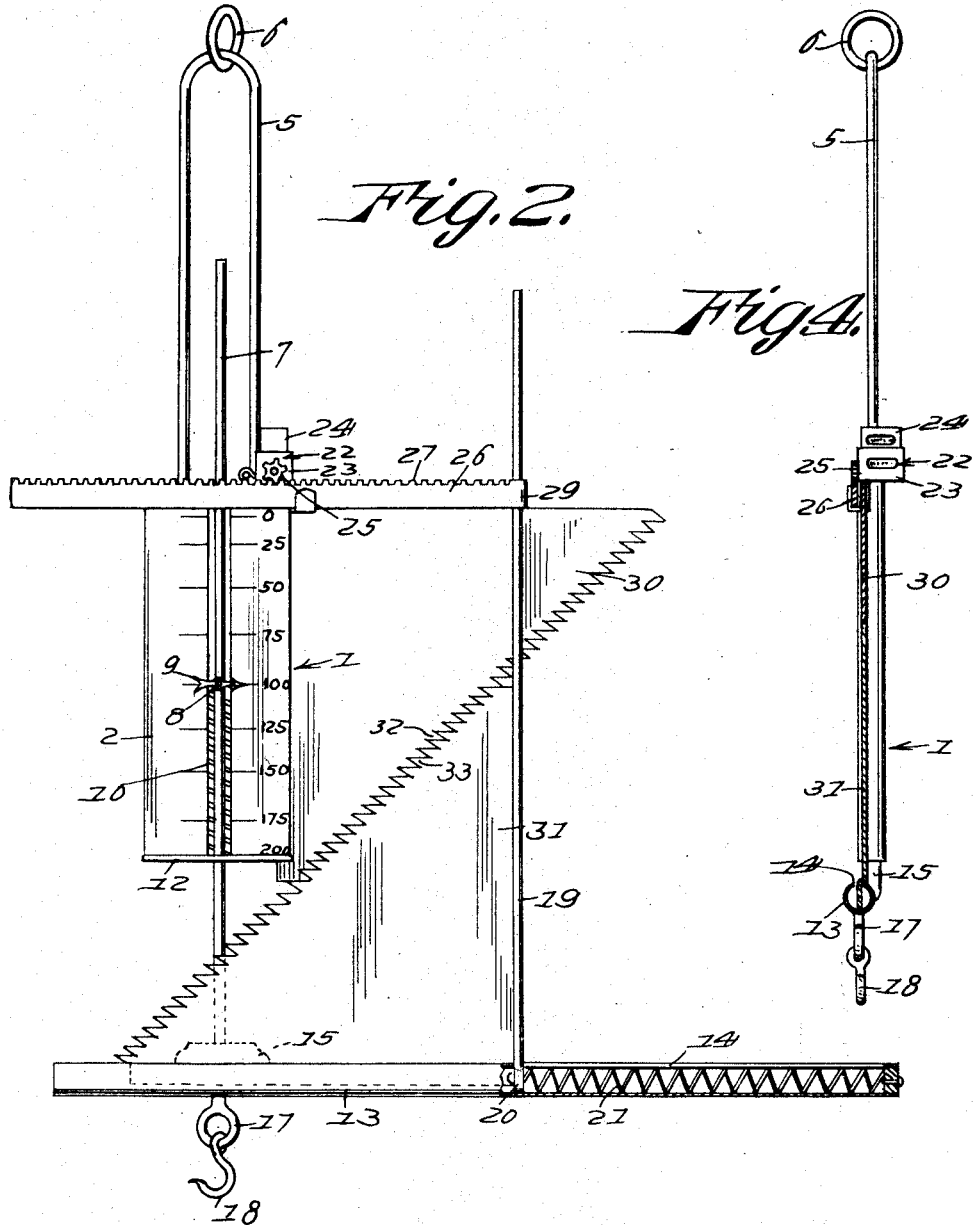
Inventor
H. R. Sessions,
By Talbert & Parker
Attorneys

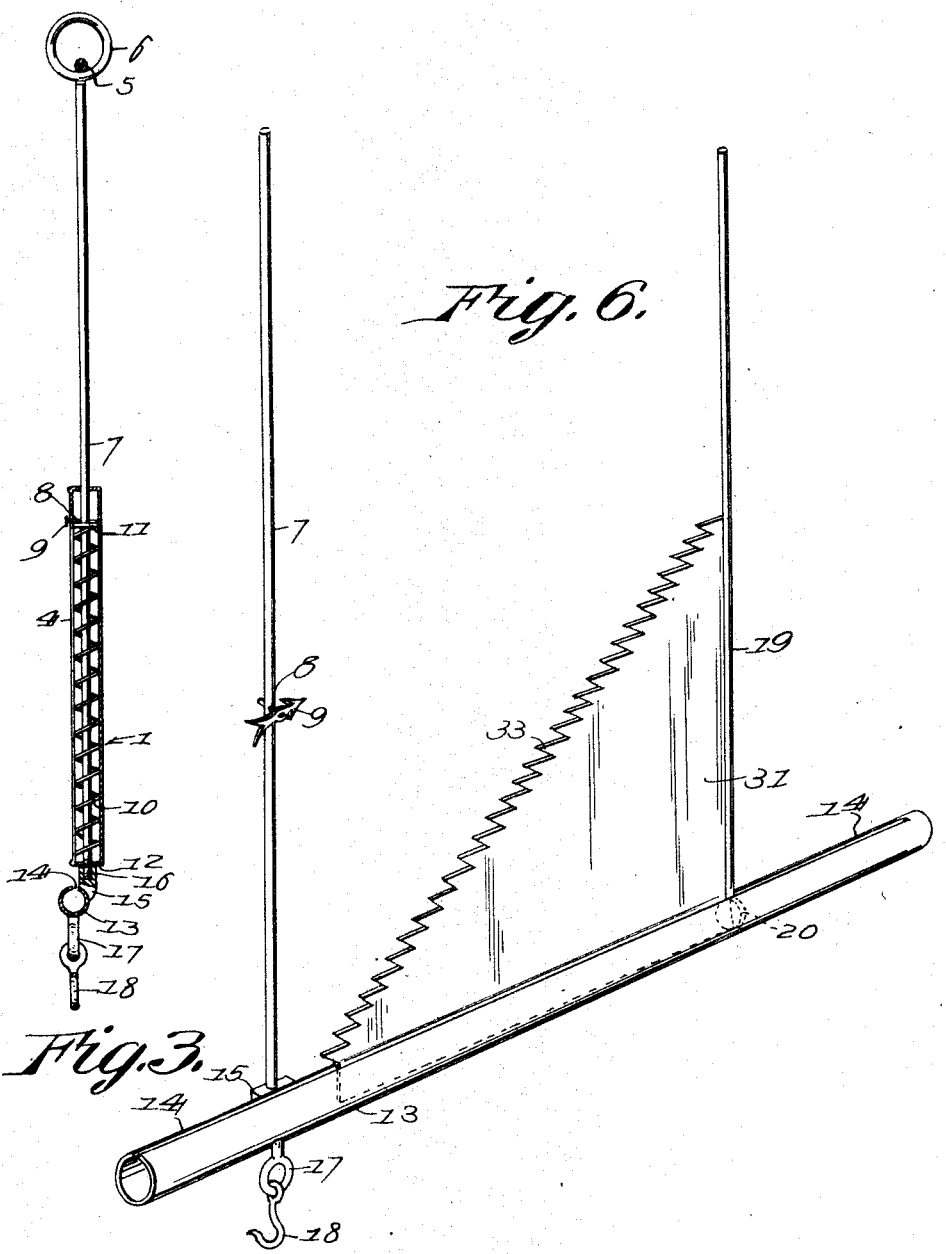

UNITED STATES PATENT OFFICE.

HAL RUCKS SESSIONS, OF LAKE VILLAGE, ARKANSAS.

WEIGHT-REGISTERING ATTACHMENT FOR SCALES.

1,282,646.    Specification of Letters Patent.    Patented Oct. 22, 1918.

Application filed August 22, 1917. Serial No. 187,722.

*To all whom it may concern:*

Be it known that I, HAL RUCKS SESSIONS, a citizen of the United States of America, residing at Lake Village, in the county of Chicot and State of Arkansas, have invented certain useful Improvements in Weight-Registering Attachments for Scales, of which the following is a specification, reference being had therein to the accompanying drawing.

This invention has reference generally to improvements in that class of inventions known as scales and more particularly relates to a weight registering attachment for scales.

As the primary aim and object this invention contemplates the provision of a device of the above mentioned character designed to register the weight of an article or object at the time the same is being weighed, enabling the attendance to ascertain the total weight of the objects weighed during the course of a day or other predetermined period.

It is an equally important object of this invention to provide a device of the above mentioned character wherein the construction permits of the adjusting of the attachment subsequent to weighing an object to assure of the proper and accurate weight of the article or object preparatory to removing the latter from the scales.

More particularly the invention embraces the provision of a weight registering attachment wherein coöperative means is mounted on a dial of a scale and on the main beam for serving as a safety stop in order to assure of the proper and accurate registration of the registering means.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Figure 1 is a side elevation of the invention showing the scales in an inactive position;

Fig. 2 is a side elevation thereof, the scales being shown in an operative position:

Fig. 3 is a vertical transverse section on lin 3—3, Fig. 1 in the direction in which the arrows point;

Fig. 4 is a transverse section on the line 4—4, Fig. 1, in the direction in which the arrows point;

Fig. 5 is a horizontal section taken through the device;

Fig. 6 is a perspective detail.

Similar characters of reference are employed in all the above described views, to indicate corresponding parts.

Referring now, more particularly, to the accompanying drawings, there is provided a scale of a spring balanced type, indicating in its entirety by the numeral 1 and preferably consisting of a dial plate 2 of a rectangular contour having on its outer surface at spaced intervals graduations and indicia indicative of the number of pounds. The body is recessed longitudinally throughout its length and accommodates a cylinder 3 having a longitudinal slot 4 therethrough having a purpose that will presently appear. A hanger 5, preferably of an inverted U-shaped configuration is connected to the upper edge of the dial while a ring 6 is loosely connected thereto to facilitate the hanging of the scale. The main balance beam is prefearbly formed of rod metal and is slidably mounted in the cylinder 3 while a lug 8 projects at right angles to the longitudinal axis thereof and is slidably arranged through the slot 4. An indicator 9 is mounted on the outer end of the lug and is positioned transversely of the rod so as to coöperate with the graduations on the dial while suitable means such as a coil spring 10 is arranged within the cylinder and about the rod and has its upper end abutting against the washer 11 which in turn holds the washer against the lug while its opposite end is designed to abut a flange 12 extending outwardly from the lower end of the plate. This flange of course is provided with an opening to allow a sliding movement of the rod therethrough.

In order to provide an improved registering attachment a supplemental beam 13 is employed being preferably constructed in a tubular formation having one end closed and the opposite end open and being further provided with a longitudinal slot 14 which extends from its open end and terminates short of the closed end for a purpose that will presently appear. A boss 15 is carried by the supplemental beam at one side of the slot and is provided with a threaded socket 16 for accommodating the corresponding lower end of the main beam 7. In this connection it will be observed that in addition to serving as a means for connecting the beams the boss also limits the upward movement of the main beam. A ring 17 is rigidly connected to the under surface of the supplemental beam 13 and loosely receives a hook 18 adapted to receive the article to be weighed.

Slidably mounted in the slot in the supplemental beam is a vertically arranged rod 19 the lower end of which is enlarged in a disk-like formation, as at 20, and is slidably received within the tubular supplemental beam 13, as indicated. Suitable resilient means, such as a coil spring 21, has its respective ends connected to the disk-like enlargement and to the closed end of the beam 13 and serves to normally hold the bar against the inner end of the slot and incidentally serves as a means for automatically returning the bar to its position in a manner that will hereinafter become apparent.

Suitable registering means such as the automatic counter 22, of any conventional type, is employed and is mounted on the upper end of the dial, as indicated. The counter preferably consists of a total register 23 and a sub-total register 24 the former having a relatively small cog 25 rigidly mounted on the projecting end of its shaft for a purpose that will hereinafter appear.

In order to actuate the register a rack bar 26 is employed, being provided with teeth 27 on its upper surface which are arranged to mesh with the teeth of the cog 25 when the rack bar is slid transversely of the beam. A resilient bracket, indicated in its entirety, by the numeral 28 has one end connected to the dial and its opposite end designed to accommodate the rack bar and hold it in yielding engagement with the cog. A sleeve 29 is formed on the front face of the inner end of the rack bar and slidably receives the vertically arranged bar 19 and by this arrangement it will be apparent that subsequent to the downwardly sliding movement of the bar 19 the latter may be shoved inwardly to correspondingly move the rack bar 26 which in turn actuates the register.

Coöperating with the bar 19 in the rack bar 26 to assure of the accurate registering of the object being weighed, by limiting and stopping movement of the rack bar, are a pair of triangular shaped plates 30 and 31. The plate 30 is carried on the outer surface of the dial adjacent one edge thereof while a series of teeth 32 are formed on the hypotenuse edge of the plate and each of these teeth are inclined upwardly so as to be readily engaged by the downwardly inclined teeth 33 formed on the hypotenuse edge of the plate 31 which in turn is carried by the inner surface of the vertical bar 19.

The mode of operation of the present invention may be reviewed as follows: Assuming that the parts have been assembled in the manner described the article to be weighed is adapted to be hung on the hook 18 which causes the main beam 7 to move downwardly against the tension of the coil balance spring 10 until the spring counterbalances the weight. The pointer or indicator 9 of course being carried by the beam moves therewith and when the beam stops the pointer is arranged adjacent the desired indicia on the dial and thus indicates the weight of the article. At this point the bar 19 is moved inwardly against the tension of the coil contractual spring 21 so as to correspondingly move the rack bar 26 and inasmuch as the teeth 27 of the rack bar mesh with the teeth 25 during the inward sliding movement of the rack bar the counter will be actuated to register the weight. As soon as the bar 19 is released the spring 21 automatically returns the bar 19 to its original position and subsequent to the removal of the article being weighed from the hook 18 the balance spring 10 will of course raise the main beam until the boss 15 strikes the lower edge of the dial. Of course this operation may be repeated and inasmuch as the register is capable of continuous operation the total weight of the articles or objects weighed during the course of a day or other predetermined period may be readily ascertained.

As many changes could be made in the above construction and many apparently widely different embodiments of this invention could be made without departing from the scope thereof it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus fully described my invention what I claim as new and desire to secure by Letters Patent is:—

1. The combination with a hanging spring balanced scale, of a supplemental beam carried by the lower end of the main beam of the scale, a vertical bar slidably and resiliently mounted in the supplemental beam, a rack bar slidable with respect to the scale and through which the vertical bar is slidable, a register carried by the scale and engaged by the rack bar, and coöperative means on the scale and the vertical bar for limiting the sliding movement of the rack bar with respect to the register.

2. The combination with a hanging spring balanced scale, of a supplemental beam carried by the lower end of the main beam of the scale and arranged at right angles thereto, a vertically arranged bar slidably mounted for horizontal movement in the supplemental beam, a register mounted on the front face of the dial of the scale, a rack bar slidably mounted on the dial of the scale and operatively engageable with the register, a sleeve on the outer end of the rack bar and through which the vertically arranged bar is slidable, coöperative means on the dial of the scale and on the vertical bar for limiting the sliding movement of the rack bar with respect to the register, and resilient means for automatically returning the vertical bar to its normal position subsequent to the actuation of the register.

3. The combination with a hanging spring balanced scale, of a supplemental beam carried by the lower end of the main beam of the scale and arranged at right angles thereto, a vertical bar slidably mounted in the supplemental beam, a registering counter mounted on the front face of the dial of the scale, a rack bar slidably mounted on the front face of the dial of the scale and engageable with the counter to actuate the same subsequent to downward movement of the main beam of the scale supplemental beam, a sleeve on the inner end of the rack bar and through which the vertical bar is slidably mounted, a pair of triangularly shaped plates carried respectively by the dial of the scale and the vertical bar and having teeth on the adjacent edges for engagement with each other to limit the inward sliding movement of the rack bar and assure of the proper actuation of the counter, and resilient means mounted in the supplemental beam and connected to the vertical bar for automatically returning the vertical bar and the rack bar to their normal position subsequent to the actuation of the registering counter.

4. The combination with a hanging spring balanced scale, of a tubular supplemental beam carried by the lower end of the main beam of the scale and arranged at right angles thereto, the supplemental beam being provided with a longitudinal slot, a register mounted on the front face of the dial of the scale, a rack bar slidably mounted on the front face of the dial of the scale for actuating the register, a bar arranged for vertical sliding movement through the rack bar and having its lower end slidably mounted in the slot in the supplemental beam and adapted to be pushed through the slot subsequent to downward movement of the main beam of the scale upon the weighing of an object, coöperative means on the dial and on the vertical bar for limiting inward sliding movement of the rack bar and assuring of the accurate actuation of the register, and resilient means for automatically returning the vertical bar and the rack bar to their normal position subsequent to the actuation of the register.

5. The combination with a hanging spring balanced scale, of a supplemental beam carried by the lower end of the main beam of the scale, a register on the dial of the scale coöperative means on the supplementl beam and on the dial of the scale for actuating the register subsequent to downward movement of the main beam of the scale, means for limiting the movement of the actuating means to assure of the accurate actuation of the register, and means for automatically returning the actuating means to normal position subsequent to the actuation of the register.

In testimony whereof I affix my signature.

HAL RUCKS SESSIONS.

Copies of this patent may be obtained for five cents each, by addressing the "Commissioner of Patents, Washington, D. C."